United States Patent Office 3,574,828
Patented Apr. 13, 1971

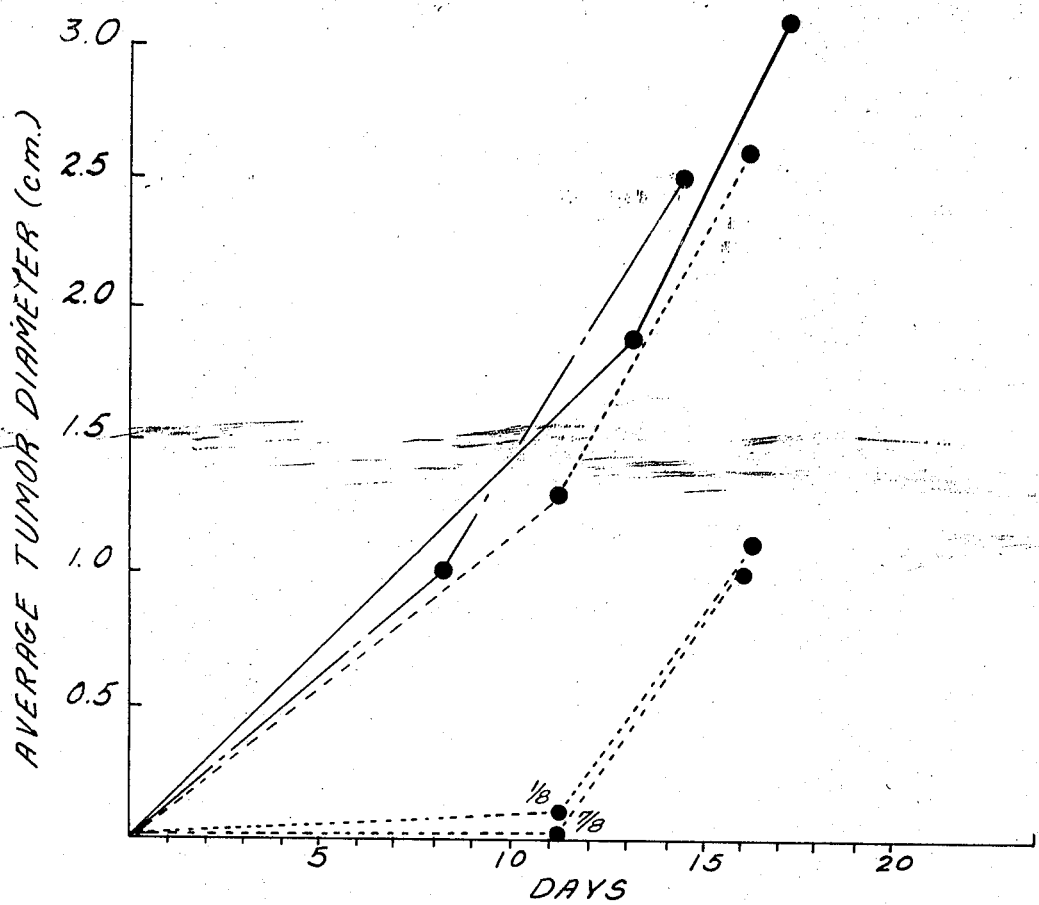

3,574,828
METHOD OF OBTAINING ANTI-LYMPHOMA ANTIBODIES
Julia McCain Lampkin-Hibbard, Oklahoma City, Okla., assignor of fractional part interest to Roderick Knott, Miami, Fla.
Continuation of application Ser. No. 261,687, Feb. 28, 1963. This application July 14, 1967, Ser. No. 653,576
Int. Cl. A61k 27/00
U.S. Cl. 424—85                    3 Claims

ABSTRACT OF THE DISCLOSURE

This invention describes the method of obtaining anti-lymphoma antibodies which comprises isolating nucleoproteins from a lymphosarcoma, introducing the nucleoproteins into a host, withdrawing blood from the host, and obtaining antibodies from the blood.

---

This application is a continuation of Ser. No. 261,687, filed Feb. 28, 1963, and now abandoned.

The present invention relates to cancer and more particularly to certain virus-like constituents of cancerous tissues and their ability to induce tumors and antibody formation. It has been found that certain nucleic acids extracted from tumors, which will be designated "infectious" nucleic acids, will induce the formation of tumors when injected in host animals, and that the tumors thus formed have different characteristics from the tumors which were the source of the nucleic acids. It also has been found that nucleoproteins isolated from tumors have the capacity to induce the formation of antibodies in host animals which immunize against cancer in the host, and that anti-cancer vaccines may be made from tumors.

The tumors with which the invention is most concerned are a class of lymphocytic neoplasm which may be described as lymphosarcoma or lymphoma. Several distinguishable types of tumors have been developed within this class, but the original type from which the others were derived is designated P1798(S). This tumor was originally caused by a series of treatments of a male mouse with diethylstilbestrol-cholesterol and is fully described by Lampkin et al., Journal of the National Cancer Institute, volume 20, pages 1091–1112, June 1958.

These tumors are sensitive to certain steroids, especially 9-α-fluorohydrocortisone (9-AFH), which cause regression of tumors after they are transferred subcutaneously into mice as descirbed by Lampkin-Hibbard in the Journal of National Cancer Institute, volume 24, pages 1352–1366 (1960). A second line of subcutaneously-transferred tumors was developed from P1798(S) which is resistant to (9-AFH) and is described by Lampkin-Hibbard, Journal of the National Cancer Institute, volume 24, pages 1341–1352 (1960). Because of its resistance to steroids, it is designated P1798(R). Surprisingly, this tumor is sensitive to 5-fluorouracil (FU) which, though chemically unrelated to (9-AFH), causes tumor regression. (FU) does not have the same effect on the steroid-sensitive tumors P1798(S) (Resistant to FU).

From these two types of tumor, other tumors may be derived, in accordance with one aspect of the invention.

Desoxyribonucleic acid was extracted from P1798(S) tumors in accordance with the methods described by K. S. Kirby in Biochemical Journal, volume 66, pages 495 (1957) and volume 70, page 260 (1958) and by L. Kit in Archives of Biochemistry, volume 87, page 318 (1960).

EXAMPLE I

Kirby kit method of preparation of DNA (desoxyribonucleic acid)

In the case of P1798(S) "infectious DNA" which was used to induce a mutant, JL1161 (resistant to steroid) in a new born mouse as indicated in Example II, the following steps were carried out in sequence.

(1) 38 grams of P1798(S) lymphoma (tumor) was obtained by sacrificing BALB/c mice bearing large 14 day tumors and pooling the tumors from a number of mice until there was obtained 38 to 40 grams of tumor. (The tumors were placed in a Petri dish and stored in an ice container to keep cold.)

(2) Then the tumors were homogenized in the cold with 10–16 volumes of 6% sodium p-aminosalicylate (6 grams/100 cc.) for 10 minutes.

(3) An equal volume of 90% phenol (90 gm./100 cc.) was then added, and the mixture was stirred for 1 hour at room temperature with a magnetic stirrer.

(4) The homogenate was then centrifuged. To the aqueous phase containing the extracted nucleic acids (top layer after centrifuging) an equal volume of ethylene glycol monoethyl ether (ethyl Cellosolve) was added and the DNA which precipitated out was dissolved in 0.01 molar NaCl.

(5) Sodium acetate was dissolved in the solution to a final concentration of 4% (4 grams/100 cc.) and the DNA was reprecipitated with an equal volume of ethyl Cellosolve.

(6) The reprecipitation step was repeated and the DNA was finally dissolved in 0.01 molar NaCl.

(7) After the addition of sodium acetate (4% final concentration) approximately 1–2 mg. of crystalline pancreatic ribonuclease (obtained from Sigma Chemical Co.) was added per gram wet weight of the original tissue and the DNA solution was incubated overnight at 4° C.

(8) The DNA was precipitated by adding an equal volume of ethyl Cellosolve and redissolved in 0.01 molar NaCl.

(9) One volume of 2.5 molar $K_2HPO_4$, one-twentieth of a volume of 33% $H_3PO_4$ and 1 volume ethylene glycol monomethyl ether (methyl Cellosolve) were added and the mixture was shaken.

(10) Polysaccharide impurities are extracted into the bottom layer (aqueous) by this treatment.

(11) After centrifugation, the organic phase was withdrawn and dialyzed at 4° C. against several changes of 0.01 molar NaCl (1.0% sodium acetate may also be used) to remove low molecular weight compounds and the enzymatically degraded RNA.

(12) After the addition of sodium acetate to a final concentration of 4%, again 1 volume ethyl Cellosolve was added and the DNA was precipitated from solution.

(13) The DNA was washed with a solution consisting of one part of 0.15 molar NaCl and three parts of ethanol.

(14) The DNA was dried in a desiccator containing $CaCl_2$ in the refrigerator.

(15) The DNA that was dried in the desiccator was then weighed out in the same manner a drug would be and made up with saline so that 0.05 cc. contained a concentration of 0.125 mg. of DNA.

(16) The purity of the DNA was checked with the diphenylamine test and read in a Beckman DU spectrophotometer.

The DNA extracted as in Example I was used to induce tumors in mice as follows:

EXAMPLE II

With a 27-gauge needle, 0.125 mg. of the DNA in 0.05 cc. saline was injected subcutaneously at the dorsal side of the head into a BALB/c male mouse 5½ hours after birth. When it was 29 days old, the mouse was sacrificed and had a lymphoma at the site of injection 2.8 x 1.7 x 1.5 cm. This type of tumor will be designated JL-1161 Lymphoma.

extracted from the tumors which now is capable of inducing tumors after incubation with amino acids and adenosine triphosphate, as indicated below. The "infectious" RNA was prepared as follows:

EXAMPLE IV

Mice with established P1798(R) tumors were given 4 injections of FU at a dosage of 25/mg./kg. at five hour intervals. Five hours after the last injection, the mice were sacrificed to obtain the tumors.

The first six steps of Example I are repeated to isolate a mixture of DNA and RNA.

TABLE 1.—BIOASSAYS WITH 9-α-FLUOROHYDROCORTISONE AND 5-FLUOROURACIL IN DNA DEVELOPED LYMPHOMAS

| | | | | | | 12th day | | 19th day | | |
| --- | --- | --- | --- | --- | --- | --- | --- | --- | --- | --- |
| Type lymphoma | Compound | Day treatment initiated | Dose mg./kgm. | Number of treatments | Number mice | Number of tumors | Average tumor diameter (cm.)± S.E. | Number tumors | Average tumor diameter (cm.)± S.E. | Percent change body weight |
| JL1161 (DNA) gen. 21 | Control | 1 | | | 7 | 7 | 1.8±0.17 | 4 | 3.1±0.09 | +12.4 |
| | FU | 1 | 15 | 10 | 20 | 0 | 0 | 0 | 0 | +1.3 |
| | FU | 12 | 25 | 5 | 9 | 9 | 2.1±0.08 | 0 | 0 | −15.4 |
| | 9-AFH | 12 | 25 | 5 | 9 | 9 | 2.0±0.10 | 6 | 2.9±0.05 | +8.5 |

EXAMPLE III

Transplantation of JL-1161 lymphoma

All transplanting of tumors is carried out with complete sterile technique. The Petri dishes, saline (physiological) and instruments are autoclaved for 30 minutes to prevent any bacterial infection of the tumor. Fourteen day old tumors are excised from BALB/c mice after sacrificing and placed in a sterile Petri dish. The tumor tissue is then sliced with a scalpel (sterile) to 1.5 mm.³ size and placed with sterile forceps into a 13 gauge trocar needle. The tumor inoculum is then placed subcutaneously on the right side of a BALB/c mouse (inbred) with the 13 gauge trocar needle. After the tumor inoculums are cut to the proper size, saline is poured on top of them to prevent drying. All tumors are transplanted before 30 minutes time after the sacrifice of the mouse to prevent drying and insure 100% "takes" of tumor.

This tumor, unlike the one from which it was derived (P1798(S)) was found resistant to steroids but sensitive to fluorouracil. Mice in which JL-1161 had been transplanted developed tumors and the mice were then treated with daily doses of 25 mg./kg. of (9-AFH) or (FU) with results as indicated in Table 1.

Ribonucleic acids extracted from P1798 tumors behave differently and do not induce tumor formation. However, it has been found possible to render RNA from P1798(R) tumors "infectious." The host animals whose tumors have RNA are treated with FU. Shortly thereafter, before the tumors regress, the animals are sacrificed and RNA is The nucleic acid RNA is then purified by incubating with 2 mg. of deoxyribonuclease per gram wet weight of tumor tissue (Sigma Chemical Co.) for twelve hours to remove any of the DNA, at 4° C. Until this point both DNA and RNA are present. The important step is the enzyme incubation. When ribonuclease is used, this destroys RNA and leaves pure DNA and, when deoxyribonuclease is used, this destroys DNA and leaves pure RNA.

Ten mg. of the RNA preparation was incubated for 70 days with 10 mg. arginine, 10 mg. of D and L tryptophan and 10 mg. of adenosine triphosphate in 50 cc. of medium 199 to activate the RNA to become infectious. This long incubation at 37° C. demonstrates absolutely that no cells were present and that an agent was present which acted as a virus.

BALB/c mice were given 5 injections of 0.1 mg. of the resultant "activated RNA" preparation (in 0.5 cc. of medium 199) intraperitoneally at intervals of three days and tumors designated JL762 and JL862 were observed which are compared in Table 2. In general, the tumors were sensitive to 9-AFH and resistant to FU, the opposite of the sensitivity of the tumors from which they were derived. A male mouse in one of the test groups containing 8 adult mice developed lymphocytic ascites which was accompanied by extensive metastasis of lymphoma cells in the mesentary. There was no evidence of a large liver or spleen. As shown in Table 2, TABLE 2.—BIOASSAYS WITH 9-α-FLUOROHYDROCORTISONE AND 5-FLUOROURACIL IN RNA DEVELOPED LYMPHOMAS

| Type lymphoma | Compound | Day Treatment initiated | Dose, mg./kgm. | Number of treatments | Number mice | Number of tumors | Average tumor diameter (cm.) ±S.E. | Number of tumors | Average tumor diameter (cm.) ±S.E. | Percent Change body weight |
| --- | --- | --- | --- | --- | --- | --- | --- | --- | --- | --- |
| | | | | | | | 8th day | | 13th day | |
| JL762 (RNA)[1] | Control | 8 | | | 8 | 8 | 1.65±0.05 | 7 | 2.4±0.11 | +28.3 |
| | 9-AFH | 8 | 25 | 5 | 9 | 9 | 1.7±0.04 | 2 | 0.16 (7 mice neg.) | −14.7 |
| | FU | 8 | 25 | 5 | 9 | 9 | 1.6±0.02 | 9 | 1.6±0.04 | −12.9 |
| | | | | | | | 10th day | | 15th day | |
| JL762A (RNA)[2] | Control | 10 | | | 8 | 8 | 1.7±0.05 | 8 | 2.5±0.07 | +30.9 |
| | 9-AFH | 10 | 25 | 5 | 19 | 19 | 1.6±0.03 | 5 | 0.4±0.28(14 neg.) | −12.7 |
| | 6,9α-difluoro 16α-methyl prednisolone | 10 | 15 | 5 | 9 | 9 | 1.5±0.04 | 0 | 0 | −16.6 |
| | FU | 10 | 25 | 5 | 7 | 7 | 1.6±0.11 | 4 | 1.9±0.04 (3 neg.) | −13 |
| | | | | | | | 8th day | | 13th day | |
| JL862A (RNA)[3] | Control | 8 | | | 4 | 4 | 1.5±0.07 | 4 | 2.7±0.09 | 21.0 |
| | 9-AFH | 8 | 25 | 5 | 5 | 5 | 1.6±0.09 | 2 | 0.4 (3 neg.) | −26 |
| | FU | 8 | 25 | 5 | 4 | 4 | 1.5±0.07 | 4 | 1.8±0.05 | −7 |

See footnotes at end of table.

TABLE 2.—BIOASSAYS WITH 9-α-FLUOROHYDROCORTISONE AND 5-FLUOROURACIL IN RNA DEVELOPED LYMPHOMAS

| Type lymphoma | Compound | Day Treatment initiated | Dose, mg./kgm. | Number of treatments | Number mice | Number of tumors | Average tumor diameter (cm.) ±S.E. | Number of tumors | Average tumor diameter (cm.) ±S.E. | Percent Change body weight |
|---|---|---|---|---|---|---|---|---|---|---|
| | | | | | | | 8th day | | 13th day | |
| JL862B(RNA)[4] | Control | 8 | | | 4 | 4 | 1.1±0.07 | 4 | 2.3±0.10 | +30.0 |
| | 9-AFH | 8 | 25 | 5 | 4 | 4 | 1.2±0.07 | 1 | 0.3 (3 neg.) | −6 |
| | FU | 8 | 25 | 5 | 4 | 4 | 1.4±0.10 | 4 | 1.2±0.14 | −25 |
| | | | | | | | 14th day | | 19th day | |
| JL762(gen. 14)[5] | Control | 14 | | | 9 | 9 | 1.8±0.02 | 8 | 2.3±0.05 | +20 |
| JL762A(gen. 14) | | | | | | 9 | 1.8±0.13 | 8 | 2.5±0.09 | |
| JL762 (gen. 14) | 9-AFH | 14 | 25 | 5 | 10 | 10 | 1.9±0.07 | 7 | 0.2 (3 neg.) | −32 |
| JL762A (gen. 14) | | | | | | 10 | 1.8±0.06 | 2 | 0.2 (8 neg.) | |
| JL762 (gen. 14) | FU | 14 | 25 | 5 | 9 | 9 | 1.9±0.05 | 9 | 1.7±0.03 | −25 |
| JL762A (gen. 14) | | | | | | 9 | 1.9±0.07 | 9 | 1.7±0.04 | |
| JL862A (gen. 12)[6] | Control | | | | 9 | 9 | 2.1±0.04 | [7]6 | 2.7±0.08 | +23 |
| JL862 (gen. 10) | | | | | | 9 | 2.0±0.05 | 6 | 2.2±0.07 | |
| JL862 (gen. 12) | 9-AFH | 14 | 25 | 5 | 10 | 10 | 2.1±0.05 | 4 | 0.2 (5 neg.) | −43 |
| JL862B (gen. 10) | | | | | | 10 | 2.0±0.08 | 3 | 0.2 (6 neg.) | |
| JL862A (gen. 12) | FU | 14 | 25 | 5 | 9 | 9 | 2.2±0.06 | [8]5 | 2.0±0.10 | −12 |
| JL862B (gen. 10) | | | | | | 9 | 2.0±0.07 | 5 | 1.9±0.08 | |

[1] Tumor developed 39 days after first injection of RNA, (male).
[2] Tumor developed 46 days after first injection of RNA, (female).
[3] Tumor developed 63 days after first injection of RNA, (male).
[4] Tumor developed 63 days after first injection of RNA, (female).
[5] JL762 lymphoma was inoculated on the right and JL762A lymphoma was inoculated on the left side of the same mouse.
[6] JL862A lymphoma was inoculated on the right and JL862B lymphoma was inoculated on the left side of the same mouse.
[7] Three mice died with large tumors on both sides before the 19th day.
[8] Four mice died with large tumors on both sides before the 19th day.

this "activated" RNA-developed tumor, a JL762 lymphoma, was bioassayed with 9-AFH and FU and found to be completely sensitive to 9-AFH and resistant to FU. Since the original RNA was extracted from P1798 (R) tumor (sensitive to FU) these data indicate that the "pretreatment" of RNA with FU altered the RNA and produced a 9-AFH sensitive tumor which was similar to the original P1798 (S) tumor. Another mouse from the same group developed a lymphoma 24 days later and was bioassayed with 9-AFH and FU. This lymphoma is referred to in Table 2 as JL862A. JL862A lymphoma was also found to be sensitive to 9-AFH. Another RNA tumor, JL762A, developed in a female mouse in a group of 5 adult mice and was bioassayed in the same manner. Two kinds of lymphoma cells were observed upon making a smear of ascites. Both cells are characteristic of a lymphocytic neoplasm. The smaller cells are probably sensitive to steroids since JL762A is primarily a sensitive to 9-AFH tumor and consists mostly of a large nucleus and some pseudopodia, with a small amount of cytoplasm. The two larger lymphocytic cells are probably the ones resistant to steroid (sensitive to FU). This was indicated since some tumors sensitive to FU grew upon a first generation transfer of JL762A lymphoma. The nuclei are larger and more cytoplasm is present. The 9-AFH given at a dose of 25 mg. per kg. caused essentially complete regression of established tumors in 19 mice. Furthermore, 6α,9α-difluoro-16α-methyl-prednisolone, given at a dose of 15 mg. per kg. also caused complete regression of JL762A lymphoma, thus indicating again that this RNA tumor was sensitive to steroid. However, in this case, 4 out of 7 mice showed resistance when FU was given at a dose of 25 mg. per kg. and 3 mice were completely sensitive (mice living 130+ days) to FU. These data indicate that possibly some of the (R) tumor cells (sensitive to FU) were present in the original population of cells of JL762A. Another female mouse from the same group developed a lymphocytic ascites and was labeled JL862B. Metastasis in the mesentary and right kidney was found. Bioassay with 9-AFH and FU showed JL862B to be sensitive to 9-AFH. Another male mouse died of lymphocytic ascites in 71 days (3 out of 8 mice).

The JL762 and JL762A lymphomas were bioassayed with 9-AFH after being passed in series in transplant without any drug treatment. The 9-AFH was given at a dosage of 25 mg. per kg. to mice bearing both JL762 and JL762A in the same host on the 14th day after inoculation of these neoplasms. After five days of treatment with 9-AFH, the JL762 and JL762A which had changed from a resistant to a sensitive tumor regressed almost completely and has remained stable and irreversible after 14 transfer generations. This would indicate a permanent mutation has occurred. JL862A and JL862B lymphomas were inoculated into the same host and treated in the same manner with 9-AFH. Likewise a mutation from a resistant to a sensitive tumor occurred in neoplasms JL862A and JL862B. This change has remained stable and irreversible after 12 and 10 transfer generations respectively. (See Table 2.)

As noted previously, it has been found that, in addition to the nucleic acids derived from tumors being capable of inducing cancer in a virus-like manner, nucleoproteins from a variety of the types of tumors can induce antibody formation.

Nucleoproteins are isolated as follows: Tumors of the P1798(S) or (R) types are isolated untreated or pretreated with drugs. When a pretreatment is used FU is injected subcutaneously at a dose of 25 mg. per kg. every 6 hours, to BALB/c mice bearing large established (R) tumors (sensitive to FU) for 24 and 48 hours intervals, and then the mice were sacrificed to obtain the tumors. 9–AFH was injected subcutaneously at the same dosage and manner to BALB/c mice bearing large established (S) tumors and then sacrificed to obtain the tumors. The tumors are weighed and homogenated in a Waring Blendor with ice cold distilled water to keep from denaturing proteins. The homogenate is centrifuged for seven minutes at 3000 r.p.m. and the supernatant decanted and further fractionated by passing through a Seitz filter. The precipitate containing the nucleoproteins from the tumor is further washed three times with cold distilled water. The hypotonic properties of the water splits the cell. After washing, the precipitate of the nucleoproteins is resuspended in physiological saline at a concentration of 10%. Similar procedures may be used with all of the above types of tumor and have also been used with human tumors including adenocarcinoma from the colon and breast carcinoma freshly obtained by operation.

The saline solutions of nucleoproteins were injected intrapertitoneally into rabbits biweekly (2½–4 weeks) for the production of antibodies and antibody neutralization tests have confirmed their effect. Antisera can be obtained in the same way from C57BL mice and Fischer rats. Antibody neutralization tests were used to confirm the presence of antibodies, similar to the tests described by Friend in the Journal of Experimental Medicine, volume 109, page 217 (1959) except that solid P1798 and other lymphomas were used instead of the leukemic spleens employed by Friend.

The antisera from the rabbits are obtained by drawing the blood directly from the rabbit's heart (to obtain pure non-contaminated blood). The blood was allowed to clot in ice; and then centrifuged. The clear supernatant serum was then placed in an incubator at 56° C. for 30 minutes to inactivate any substances that might destroy the activity of the antibodies.

The test used in the neutralization of antibodies consists in making a 20% tumor homogenate in saline separately from three different lymphoma lines: P1798(S), P1798(R) and JL1161 lymphomas. An equal volume of 20% tumor homogenate is added to an equal volume of undiluted serum and incubated for 1½ hours at 36° C. Two controls are run simultaneously: one by incubating 20% tumor homogenate without antiserum (this tumor homogenate causes 100% tumors when injected into BALB/c mice), the second using untreated rabbit antiserum (100% "takes" of tumors was obtained with (S) and (R) tumors). Results are shown in Table 3.

Comparable results were obtained in a study using Fischer rats to produce antisera. These antisera were prepared and obtained by pooling sera from rats after 8 injections of nucleoproteins from P1798(R) tumor pretreated with FU as described previously. The control groups of mice challenged with P1798(S) or (R) had progressively growing neoplasms on the 14th day. The same type of 100% inhibition of tumor formation of P1798(S) or (R) or JL1161 was observed. Some of this antisera was used to test for inhibition of IRC/741 Dunning leukemia in Fischer rats. However, in this experiment no tumor inhibition was observed and the average tumor diameter in 8 rats was 2.4±0.4 cm. which was comparable to controls. 100% of these rats treated with antisera died with Dunning leukemia. Results are shown in Table 4.

Formalinized vaccines were prepared by combining a 1:500 dilution of formaldehyde with a 20% solution of tumor homogenate of P1798(R) tumor pretreated with (FU). JL1161 lymphoma vaccine was prepared in the same manner but was not treated with (FU). These vaccines were injected biweekly intraperitoneally at a dose of 0.5 cc. The mice were challenged with tumor, as indicated in Table 5, the 11th day after the last injection of the vaccine. The challenge consists of inoculating the BALB/c mice with 1.5 mm.$^3$ of tumor with a 13 gauge trocar. The JL1161 lymphoma was inhibited 3.0 times more with vaccine prepared from the JL1161 than they were with the P1798(R) lymphoma. However, some cross-sensitization was demonstrated against the JL1161 tumor when formalinized vaccine was prepared from P1798(R) tumor (pretreated with FU as described previously) and compared to the P1798(R) tumor receiving the same vaccine. The tumors in the mice challenged with JL1161 and treated with vaccine were inhibited 3.8 times more than the P1798(R) series.

TABLE 3

[The use of antisera obtained from rabbits injected with antigens from lymphomas, adenocarcinomas and one breast carcinoma to inhibit the growth of lymphocytic neoplasms of P1789 sensitive, P1798 resistant, and JL1161.]

| Tumors used in challenge | Antisera prepared from the antigenic types shown, (intraperitoneally in rabbits) | Number treatments of antigen given biweekly | Number of rabbits | Number of mice in group | Day of challenge after last injection of antigen | Effect of antisera on tumor formation [a] 14th day | |
|---|---|---|---|---|---|---|---|
| | | | | | | Number of tumors | Average tumor diameter (cm.) ± S.E. |
| P1798 S [1] | Control Untreated | 0 | 1 | 7 | [b] | 7 | 2.1±0.03 |
| P1798 R [2] | do | 0 | 1 | 10 | [b] | 10 | 2.5±0.07 |
| JL1161 | do | 0 | 1 | 10 | [b] | 10 | 2.3±0.06 |
| P1798 S or R [3] | Untreated tumor[4] homogenate, P1798 R | 5 | 1 | 4,8 | 18 | 0 | 0 |
| P1798 S or R | FU Pretreated tumor [5] homogenate, (P1798 R) | 6 | 1 | 8,10 | 16 | 0 | 0 |
| P1798 S, R or JL1161 | FU pretreated nucleoproteins, (P1798 R) | 9 | 1 | 8 | 13 | 0 | 0 |
| P1798 S or R | Untreated tumor homogenate, (P1798 S) | [6]2 | 1 | 5 | 14 | 0 | 0 |
| P1798 S or R | 9-AFH pretreated tumor homogenate, (P1798 S) | 3 | 1 | 8 | 16 | 0 | 0 |
| P1798 S, R or JL1161 | 9-AFH pretreated nucleoproteins, (P1798 S) | 9 | 1 | 8 | 13 | 0 | 0 |
| P1798 S, R or JL1161 | FU and 9-AFH pretreated nucleoproteins (1798 R and S). | 9 | 1 | 8 | 13 | 0 | 0 |
| JL1161 | Untreated tumor homogenate of JL1161 | [6]2 | 1 | 6 | 14 | 0 | 0 |
| P1798 S, R or JL1161 | Nucleoproteins from house fly larvae, (fed on yL1161). | 5 | 1 | 5,5,12 | 14 | 0 | 0 |
| P1798 S or R | Nucleoproteins from human [7] adenocarcinoma of colon, (JL-H-62). | 8 | 1 | 5 | 15 | 0 | 0 |
| JL1161 | Nucleoproteins from human adenocarcinoma of colon, (JL-H-62). | 7 | 1 | 5 | 14 | 0 | 0 |
| P1798 S or R JL1161 | Nucleoproteins from human[8] adenocarcinoma of colon, (JL-H-62A). | 7 | 1 | 5 | 14 | 0 | 0 |
| P1798 S or R JL1161 | Nucleoproteins from human[9] breast carcinoma, (JL-H-62B). | 5 | 1 | 5 | 14 | 0 | 0 |

[1] P1798 lymphoma sensitive to steroid (S).
[2] P1798 lymphoma resistant to steroid (R) (sensitive to FU).
[3] Animals were inoculated with either P1798 sensitive or resistant lymphomas or as shown in the table.
[4] Experiment was repeated with two injections to a rabbit (one 12 days after the other). Mice (5 per group) were challenged with P1798 sensitive and resistant tumors 14 days after the last injection of antigen. 100% inhibition of tumors was obtained.
[5] Experiment was repeated with 17 mice per group and antisera completely inhibited the P1798 (R) tumors.
[6] Two injections(one 12 days after the other) were given and the mice were challenged 14 days after the last injection.
[7] Experiment was repeated on two rabbits using 7 injections of nucleoproteins. Two groups of mice (8 and 5 respectively) were challenged with P1798 (R) and one group (5 mice) was challenged with P1798 (S). Antisera completely inhibited these tumors.
[8] Experiment was repeated with 5 mice per group and antisera completely inhibited the tumors.
[9] Experiment was repeated and identical results were obtained. Two additional groups of mice (8 and 13 respectively), were challenged with P1798 (R) and antisera and no tumors developed.

NOTE.—[a] The subcutaneous challenges of tumor were accomplished by inoculation with 0.2 ml. of a 20% tumor homogenate and antisera (1:1) with a sterile syringe and 22 gauge needle in the right flank. Control mice were given 0.2 ml. in the same manner except serum was obtained from untreated rabbits; [b] Control mice challenged with tumor ar the same time as the experimental groups.

TABLE 4

[The use of antisera pooled from rats injected with antigens from P1798 resistant tumor pretreated with 5-fluorouracil to inhibit the growth of lymphocytic neoplasms of P1798 sensitive, P1798 resistant and JL1161]

| Tumors used in Challenge | Antisera prepared from the antigenic types shown, intraperitoneally in rats | Number treatments of antigen given weekly | Number of rats receiving antigen, treated or untreated | Number of mice or rats in group | Day of challenge after last injection of antigen | Effect of antisera on tumor formation [a] 14th day | |
|---|---|---|---|---|---|---|---|
| | | | | | | Number of tumors | Average tumor diameter (Cm.) ±S.E. |
| P1798 S [1] | Control Untreated | 0 | 10 [3] | 8, mice | ([b]) | 8 | 2.3±0.03 |
| P1798 R [2] | do | 0 | 10 [3] | 5, mice | ([b]) | 5 | 2.7±0.05 |
| P1798 S, R or JL1161 | Nucleoproteins [4] from FU pretreated P1798 R | 8 | 10 [5] | 8, mice | 16 | 0 | 0 |
| IRC/741 Dunning leukemia in rats. | Nucleoproteins [4] from FU pretreated P1798 R | 8 | 10 [5] | 8, rats | 16 | 8 | 2.4±0.04 |
| IRC/741 Dunning leukemia in rats. | Control Untreated | 0 | 0 | 4, rats | 0 | 4 | 2.35±0.13 |

[1] P1798 lymphoma sensitive to steroid (S).
[2] P1798 lymphoma resistant to steroid (R).
[3] Ten normal rats were used as controls. The serum from these rats was pooled and one-half of antiserum was used for the P1798 (S) and one-half for the P1798 (R) challenge.
[4] Nucleoproteins from P1798 resistant tumor pretreated with FU given to Fischer rats.
[5] Antisera from 10 rats pooled and one-half used for rats and one-half used for mice.
[6] Normal rats were used as control.

NOTE.—[a] The subcutaneous challenges of tumor were accomplished by inoculation with 0.2 ml. of a 20% tumor homogenate and antisera (1:1) with a sterile syringe and 22 gauge needle in the right flank. Control mice were given 0.2 ml. in the same manner except serum was obtained from untreated rats, [b] Control mice were challenged with tumor at the same time as the experimental groups, see methods.

The following experiment relevant to the above vaccine was performed in which nucleoproteins isolated from P1798(R) were given directly to BALB/c mice as a vaccine and inhibition of JL1161 lymphoma was obtained (known as cross-sensitization) after the mice were challenged with JL1161 but not when challenged with P1798 (R) tumor.

Cross-sensitization was determined by challenging 4 groups of mice of 8 each with two tumors: JL1161 lymphoma (one group the untreated controls and the other receiving the P1798(R) nucleoproteins pretreated with FU) and the P1798(R) lymphoma (one group the untreated controls and the other receiving the P1798(R) nucleoproteins pretreated with FU). Increased cross-sensitization was shown when BALB/c mice were given 6 injections at one week intervals using a vaccine of P1798 (R) nucleoproteins pretreated with FU and challenged with JL1161 lymphoma on the 9th day after the last injection. Seven out of eight mice as shown in FIG. 1, were completely negative to the JL1161 protein lymphoma challenged group, but one mouse had an average tumor diameter of 0.1 cm. when challenged with a 1.5 mm.³ inoculum. In contrast, the P1798(R) lymphoma challenged group treated in the same manner as the JL1161 group possessed large established tumors on the 11th day. The average diameter of these tumors on the 11th day was 1.3 cm. The JL1161 untreated control group and the P1798(R) untreated group had progressively growing neoplasms on the 11th day (1.7 cm. and 1.6 cm. average tumor diameter respectively). The inhibition of the tumor formation in mice challenged with JL1161 over that observed with the P1798(R) tumor indicates that these tumors are immunologically different. In mice treated in such a manner, increased cross-sensitization was shown with the JL1161 lymphoma which was inhibited in its growth further indicating the formation of abnormal (different) protein. The cross-sensitization studies indicate that the nucleoproteins isolated from the JL1161 lymphoma are similar to the abnormal protein formed when FU is given to P1798(R) tumor. It will be noted also that the JL1161 lymphoma had more RNA per gram wet weight of tissue than the P1798(R) tumor. This may indicate the RNA is structurally different and acts as a template to influence the formation of a different sequence of

TABLE 5

[Effect of formalinized vaccines obtained from P1798 lymphoma and JL1161 lymphoma on the growth of these two type lymphomas.]

| Vaccine | Tumor challenged | Number injections, biweekly | Number mice | Day of challenge after last injection | Tumors after 10 days | |
|---|---|---|---|---|---|---|
| | | | | | Number tumors | Average tumor diameter cm.±S.E. |
| JL162, from JL1161 | JL1161 | 6 | 8 | 11 | 3 | 0.7±0.05 |
| JL162, from JL1161 | P1798 resistant | 6 | 4 | 11 | 4 | 2.1±0.13 |
| JL101, from FU treated P1798-R. | JL1161 | 11 | 10 | 11 | 10 | 0.5±0.06 |
| JL101, from FU treated P1798-R. | P1798 resistant | 11 | 8 | 11 | 8 | 1.9±0.11 |
| No vaccine, control | JL1161 | | 8 | ([1]) | 8 | 1.7±0.07 |
| No vaccine, control | P1798 resistant | | 10 | ([1]) | 10 | 1.8±0.06 |

[1] Control mice of the same age of those treated with vaccines were challenged with tumor at sth same time as the experimental groups.

amino acids and protein composition in the JL1161 than in the P1798(R) lymphomas.

The invention represents a substantial advance on the road to ultimately eliminating cancer. The best treatment of cancer is its prevention. In the above description, it has been shown in animals that nucleoproteins isolated from human an animal tumors cause antibodies to be formed when injected into a host, which antibodies are effective against mouse lymphomas. The neutralization test of antisera obtained from rabbits inoculated with nucleoproteins demonstrates that antibodies were formed. It should be possible, further, to purify these nucleoproteins by splitting them into acid soluble proteins "histones" and insoluble proteins, so that some day a type of protein can be given as a vaccine to prevent cancer. The fact that nucleoproteins given directly to mice as a vaccine inhibited lymphoma used as an active inoculum indicates that subcellular parts of cells may be useful to produce antibodies.

Another application would be that an animal with a tumor could have a biopsy, and that nucleoproteins could be isolated from the cancerous tissue thereby obtained which would be given to rabbits. Antisera would form in the rabbits and be given back to the animal which had the biopsy since the antibodies formed would be specific for him.

In addition, the techniques described for inducing the formation of tumors with nucleic acids previously "altered" with drug treatment is useful in making mutant strains from which different nucleoproteins could be isolated and given as a vaccine.

It will be appreciated that the above-described invention has still further applications in the use of immunological techniques in the prevention and treatment of cancer and that various changes and modifications may be made in the methods described without departing from the scope of this invention, as this is set forth in the claims.

What is claimed is:

1. The method of obtaining antibodies which are capable of inhibiting the formation of lymphoma in mice comprising (1) isolating nucleoproteins from a lymphosarcoma by (a) homogenizing said lymphosarcoma with ice cold distilled water, (b) centrifuging the hymogenate, (c) decanting the aqueous supernatant from the centrifuged hymogenate, (d) precipitating the nucleoproteins, (e) removing the supernatant liquid from precipitated nucleoproteins, (f) washing the precipitated nucleoproteins with cold distilled water, and (g) suspending said precipitated nucleoprotein in a saline solution, (2) introducing said saline solution of nucleoproteins intraperitoneally into a host laboratory rodent in an amount sufficient to form a lymphoma in said host, (3) subsequently withdrawing blood from said host and (4) separating blood serum containing said antibodies from said blood.

2. The method as claimed in claim 1 wherein the nucleoproteins are obtained from a breast carcinoma.

3. The method as claimed in claim 1 wherein the nucleoproteins are obtained from adenocarcinoma.

References Cited

Batchelor et al.: The Lancet, No. 7333, p. 613, Mar. 14, 1964.

Hilleman: Wenner-Gren Center International Symposium Series, vol. 6, pp. 113 and 114, 1966.

Kidd: J. Experimental Medicine, vol. 83, pp. 227 and 228, 1946.

McAllister et al.: J. National Cancer Institute, vol. 21, pp. 549 and 550, 1958.

Mohos et al.: Experimental Medicine, vol. 105, pp. 233 and 234, 1957.

Seegal et al.: Federation Proceedings, 1957, page 88.

RICHARD L. HUFF, Primary Examiner

U.S. Cl. X.R.

424—88, 180